(12) United States Patent
Leandro et al.

(10) Patent No.: US 9,651,667 B2
(45) Date of Patent: May 16, 2017

(54) COMBINED CYCLE SLIP INDICATORS FOR REGIONALLY AUGMENTED GNSS

(75) Inventors: Rodrigo Leandro, Ottobrunn (DE); Nicholas Charles Talbot, Ashburton Victoria (AU)

(73) Assignee: Trimble Inc., Sunnyvale, CA (US)

( * ) Notice: Subject to any disclaimer, the term of this patent is extended or adjusted under 35 U.S.C. 154(b) by 1234 days.

(21) Appl. No.: 13/536,912

(22) Filed: Jun. 28, 2012

(65) Prior Publication Data

US 2014/0002299 A1   Jan. 2, 2014

(51) Int. Cl.
| | |
|---|---|
| *G01S 19/43* | (2010.01) |
| *G01S 19/11* | (2010.01) |
| *G01S 19/44* | (2010.01) |
| G01S 19/04 | (2010.01) |
| G01S 19/20 | (2010.01) |

(52) U.S. Cl.
CPC ............... *G01S 19/11* (2013.01); *G01S 19/43* (2013.01); *G01S 19/44* (2013.01); *G01S 19/04* (2013.01); *G01S 19/20* (2013.01)

(58) Field of Classification Search
CPC .......... G01S 19/44; G01S 19/43; G01S 19/04; G01S 19/20; G01S 19/54; G01S 19/55; G01S 19/11
USPC ............ 342/357.26, 357.27, 357.37, 357.38; 701/469
See application file for complete search history.

(56) References Cited

U.S. PATENT DOCUMENTS

| | | | |
|---|---|---|---|
| 6,862,526 | B2 | 3/2005 | Robbins |
| 7,432,853 | B2 | 10/2008 | Vollath |
| 7,576,690 | B2 | 8/2009 | Vollath |
| 7,755,542 | B2 | 7/2010 | Chen et al. |

(Continued)

FOREIGN PATENT DOCUMENTS

| | | |
|---|---|---|
| WO | WO2005/045463 | 5/2005 |
| WO | WO2007/032947 | 3/2007 |

(Continued)

OTHER PUBLICATIONS

"A new automated cycle slip detection and repair method for a single dual-frequency GPS receiver"; Zhizhao Liu; Journal of Geodesy; Mar. 2011, vol. 85, Issue 3, pp. 171-183.*

(Continued)

*Primary Examiner* — Chuong P Nguyen
(74) *Attorney, Agent, or Firm* — Kilpatrick Townsend & Stockton LLP

(57) ABSTRACT

Methods and apparatus for determining a precise position of a rover located within a region are presented using rover observations comprising code observations and carrier-phase observations of GNSS signals on at least two carrier frequencies over multiple epochs. Correction data is received for each of the epochs at least one code bias per satellite. Synthetic reference data is generated for each of the epochs from the correction data for a synthetic station location. A determination is made for each epoch whether a cycle slip has occurred. Upon determining that a cycle slip has occurred, values of any variables of a set of state variables which are affected by the cycle slip are reset. Each epoch of rover observations and correction data is used to estimate updated values for the set of state variables including a set of ambiguities and coordinates of a precise rover position.

18 Claims, 5 Drawing Sheets

(56) References Cited

U.S. PATENT DOCUMENTS

| | | | |
|---|---|---|---|
| 7,961,141 B2* | 6/2011 | Dai | G01S 19/43 342/357.24 |
| 8,131,463 B2* | 3/2012 | Lopez | G01S 19/08 701/469 |
| 8,237,609 B2 | 8/2012 | Talbot et al. | |
| 8,451,168 B2* | 5/2013 | Henkel | G01S 19/04 342/357.44 |
| 9,128,176 B2* | 9/2015 | Seeger | G01S 19/04 343/357.27 |
| 2007/0052583 A1* | 3/2007 | Zhodzishsky | G01C 21/00 342/357.24 |
| 2009/0224969 A1 | 9/2009 | Kolb | |
| 2010/0141515 A1 | 6/2010 | Doucet et al. | |
| 2010/0214161 A1 | 8/2010 | Talbot et al. | |
| 2011/0025555 A1* | 2/2011 | Whitehead | G01S 19/33 342/357.24 |
| 2011/0260914 A1 | 10/2011 | Vollath et al. | |
| 2012/0293367 A1* | 11/2012 | Chen | G01S 19/04 342/357.68 |
| 2013/0002482 A1* | 1/2013 | Um | G01S 19/07 342/357.27 |

FOREIGN PATENT DOCUMENTS

| | | | |
|---|---|---|---|
| WO | WO2008/008099 | 1/2008 | |
| WO | WO2010/021656 | 2/2010 | |
| WO | WO2010/021657 | 2/2010 | |
| WO | WO2010/021658 | 2/2010 | |
| WO | WO2010/021659 | 2/2010 | |
| WO | WO2010/021660 | 2/2010 | |
| WO | WO2010/042441 | 4/2010 | |
| WO | WO2011/034616 | 3/2011 | |
| WO | WO 2011/034617 A2 * | 3/2011 | G01S 19/37 |
| WO | WO2011/126605 | 10/2011 | |

OTHER PUBLICATIONS

"Detector based in code and carrier phase data: The Melbourne-Wübbena combination"; Subirana et al.; Year of Publication 2011.*

U.S. Appl. No. 61/195,276, filed Oct. 6, 2008.

U.S. Appl. No. 61/277,184, filed Sep. 19, 2009.

Seeber, *Satellite Geodesy*, 2d Ed., pp. 277-281 (2003).

* cited by examiner

COMBINED CYCLE SLIP INDICATORS FOR REGIONALLY AUGMENTED GNSS

CROSS REFERENCES TO RELATED APPLICATIONS

The following are related and are hereby incorporated by reference in their entirety: U.S. patent application Ser. No. 12/660,091 filed 20 Feb. 2010 (TNL A-2549US); U.S. patent application Ser. No. 12/660,080 filed 20 Feb. 2010 (TNL A-2555US); U.S. Provisional Application for Patent No. 61/277,184 filed 19 Sep. 2009 International Patent Application PCT/US2010/002564 filed 19 Sep. 2010, published as WO 2011/034616 on 24 Mar. 2011 (TNL A-2585PCT); International Patent Application PCT/US2011/024733 filed 14 Feb. 2011, published as WO 2011/126605 on 13 Oct. 2011 (TNL A-2633PCT); International Patent Application PCT/US2009/059552 filed 5 Oct. 2009, published as WO 2010/042441 on 15 Apr. 2010 (TNL A-2288PCT); U.S. Provisional Application for Patent No. 61/195,276 filed 6 Oct. 2008 (TNL A-2288P); International Patent Application PCT/US/2009/004471 filed 5 Aug. 2009, published as WO 2010/021656 on 25 Feb. 2010 (TNL A-2526PCT); International Patent Application PCT/US/2009/004473 filed 5 Aug. 2009, published as WO 2010/021658 on 25 Feb. 2010 (TNL A-2525PCT); International Patent Application PCT/US/2009/004474 filed 5 Aug. 2009, published as WO 2010/021659 on 25 Feb. 2010 (TNL A-2524PCT); International Patent Application PCT/US/2009/004472 filed 5 Aug. 2009, published as WO 2010/021657 on 25 Feb. 2010 (TNL A-2523PCT); International Patent Application PCT/US/2009/004476 filed 5 Aug. 2009 published as WO 2010/021660 A3 on 25 Feb. 2010 (TNL A-2339PCT); U.S. Provisional Application for Patent No. 61/189,382 filed 19 Aug. 2008 (TNL A-2339P); U.S. Pat. No. 7,576,690 issued 18 Aug. 2009 (TNL A-1805US); U.S. patent application Ser. No. 12/451,513 filed 22 Jun. 2007, published as US 2010/0141515 on 10 Jun. 2010; U.S. Pat. No. 7,755,542 issued 13 Jul. 2010 (TNL A-1789US); International Patent Application PCT/US07/05874 filed 7 Mar. 2007, published as WO 2008/008099 on 17 Jan. 2008 (TNL A-1789PCT); U.S. patent application Ser. No. 11/988,763 filed 14 Jan. 2008, published as US 2009/0224969 A1 on 10 Sep. 2009 (TNL A-1743US); International Patent Application No. PCT/US/2006/034433 filed 5 Sep. 2006, published as WO 2007/032947 on 22 Mar. 2007 (TNL A-1743PCT); U.S. Pat. No. 7,432,853 granted 7 Oct. 2008; (TNL A-1403US); International Patent Application No. PCT/US2004/035263 filed 22 Oct. 2004, published as WO 2005/045463 on 19 May 2005 (TNL A-1403PCT); U.S. Pat. No. 6,862,526 granted 1 Mar. 2005 (TNL A-1006US).

TECHNICAL FIELD

The present invention relates to the field of Global Navigation Satellite Systems (GNSS). More particularly, the present invention relates to methods and apparatus for processing of GNSS data with regional augmentation for enhanced precise point positioning.

BACKGROUND OF THE INVENTION

Provisional U.S. Application for Patent 61/337,980 filed 14 Feb. 2010 of Xiaoming Chen et al. describes methods and apparatus for Global Navigation Satellite Systems (GNSS) signal processing with regional augmentation.

Trimble Navigation Limited has developed such a regionally augmented GNSS service based around a sparsely distributed ground network of GNSS reference stations covering the United States Midwest. GNSS observation data from the reference stations are concentrated at a network processing center where a regional correction signal is generated. The regional correction signal is then compressed and formatted for broadcast via L-band satellite link to users in the field.

The correction signals generated by the network server and distributed to users include the following components:
  At least one code bias per satellite;
  A phase-leveled geometric correction per satellite, derived from network fixed double-difference ambiguities;
  An ionospheric delay per satellite for each of the multiple regional network stations and/or non-ionospheric corrections.

The corrections enable construction of synthetic reference station (SRS) data for input into rover GNSS receivers, allowing the rover equipment to perform real-time kinematic (RTK) positioning. Generation of the synthetic reference station data can be performed at the rover or at a server given the approximate location of the rover.

The SRS correction stream mimics data from a physical base receiver and therefore can be processed in a manner that is very similar to standard single-base RTK position estimation using, for example, a factorized array of filters for multi-carrier ambiguity resolution (FAMCAR) as described in U.S. Pat. No. 7,432,853 or an equivalent big-filter approach. In a big-filter approach, all applicable states are modeled in one single filter, rather than in a factorized array of filters. This is discussed in more detail in a later section, entitled "SRS Data Processing using a Big Filter Approach", below.

A discontinuity in tracking of the carrier-phase of GNSS signals at a receiver is referred to as a "cycle slip," which can occur for a variety of reasons such as obstructions and weak signals. Techniques for detecting and in some cases repairing cycle slips are described for example in G. Seeber, Satellite Geodesy, 2d Ed., 2003 at pages 277-281.

A cycle slip in tracking a satellite at the rover and/or at a network reference station is directly related to a carrier, such as L1 or, more often, L2 in the case of GPS. However, as described in Provisional U.S. Application for Patent 61/337, 980, the correction signals are based on combinations of network reference station observations.

Processing methods and apparatus capable of dealing with cycle slips in positioning with regional augmentation are desired, especially to achieve faster convergence to a solution, improved accuracy and/or greater availability.

SUMMARY OF THE INVENTION

Improved methods and apparatus for processing of GNSS data with augmentation for enhanced precise point positioning are presented.

Some embodiments of the invention provide methods for determining a precise position of a rover located within a region, comprising: obtaining rover observations comprising code observations and carrier-phase observations of GNSS signals on at least two carrier frequencies over multiple epochs; receiving correction data comprising, for each of the epochs, at least one code bias per satellite, at least one of: (i) a fixed-nature Melbourne-Wübbena (MW) bias per satellite and (ii) values from which a fixed-nature MW bias per satellite is derivable, and at least one of: (iii) an ionospheric delay per satellite for each of multiple regional network stations, and (iv) non-ionospheric corrections; creating synthetic reference data for each of the epochs from the correction data for a synthetic station location; determining for each epoch whether a cycle slip has occurred in at least one of (i) the rover observations and (ii) observations at network stations used to prepare the correction data; upon determining that a cycle slip has occurred, resetting values of any variables of a set of state variables which are affected by the cycle slip while retaining values of at least some variables of the set which are not affected by the cycle slip, and using each epoch of rover observations and correction data to estimate updated values for the set of state variables, the state variables comprising a set of ambiguities and coordinates of a precise rover position.

In some embodiments, the correction data comprises at least one cycle slip indicator, and state variables affected by the cycle slip are determined from the at least one cycle slip indicator.

In some embodiments, the correction data comprises at least one ionospheric-free cycle slip indicator per satellite for a plurality of satellites, wherein determining whether a cycle slip has occurred comprises monitoring the ionospheric-free cycle slip indicators to determine an identity of at least one satellite for which an ionospheric-free cycle slip has occurred, and wherein resetting state variables comprises resetting state variables affected by the ionospheric-free cycle slip.

In some embodiments, the correction data comprises at least one ionospheric cycle slip indicator per satellite per station of a network from which the correction data are derived, determining whether a cycle slip has occurred comprises monitoring the ionospheric cycle slip indicators to determine an identity of at least one satellite-station pair for which an ionospheric cycle slip has occurred, and resetting state variables comprises resetting state variables affected by the at least one ionospheric cycle slip.

In some embodiments, using each epoch of rover observations and correction data to estimate updated values for the set of state variables comprises applying a factorized array of recursive filters comprising a code-carrier filter bank using a Melbourne-Wuebbena code-carrier combination, an ionospheric filter bank using an ionospheric carrier combination, and a geometry filter using an ionospheric-free carrier combination.

In some embodiments, determining that a cycle slip has occurred comprises monitoring an ionospheric-free cycle slip indicator per satellite to identify an ionospheric-free cycle slip as to a specific satellite, and resetting values of any variables of a set of state variables which are affected by the cycle slip comprises resetting the value of an ionospheric-free ambiguity state for the specific satellite in the geometry filter and the value of a widelane ambiguity state for the specific satellite in one of the code-carrier filters.

In some embodiments, determining that a cycle slip has occurred comprises monitoring an ionospheric cycle slip indicator per satellite to identify an ionospheric cycle slip as to a specific satellite, and resetting values of any variables of a set of state variables which are affected by the cycle slip comprises resetting the value of an ionospheric ambiguity state for the specific satellite in one of the ionospheric filters.

In some embodiments, determining that a cycle slip has occurred comprises monitoring a widelane cycle slip indicator per satellite to identify a widelane cycle slip as to a specific satellite, and resetting values of any variables of a set of state variables which are affected by the cycle slip comprises resetting the value of an ionospheric-free ambiguity state for the specific satellite in the geometry filter, resetting the value of a widelane ambiguity state for the specific satellite in one of the code-carrier filters, and resetting the value of an ionospheric ambiguity state for the specific satellite in one of the ionospheric filters.

In some embodiments, using each epoch of rover observations and correction data to estimate updated values for the set of state variables comprises applying a filter. In some embodiments, determining that a cycle slip has occurred comprises monitoring an ionospheric-free cycle slip indicator per satellite to identify an ionospheric-free cycle slip as to a specific satellite, and resetting values of any variables of a set of state variables which are affected by the cycle slip comprises resetting the value of an ionospheric-free ambiguity state for the specific satellite in the filter.

In some embodiments, determining that a cycle slip has occurred comprises monitoring an ionospheric cycle slip indicator per satellite to identify an ionospheric cycle slip as to a specific satellite, and resetting values of any variables of a set of state variables which are affected by the cycle slip comprises resetting the value of an ionospheric ambiguity state for the specific satellite in the filter.

Some embodiments provide apparatus for determining a precise position of a rover located within a region using rover observations comprising code observations and carrier-phase observations of GNSS signals on at least two carrier frequencies over multiple epochs and correction data comprising for each of the epochs at least one code bias per satellite, at least one of: (i) a fixed-nature MW bias per satellite and (ii) values from which a fixed-nature MW bias per satellite is derivable, and at least one of: (iii) an ionospheric delay per satellite for each of multiple regional network stations, and (iv) non-ionospheric corrections, comprising: a synthetic reference station module operative to create synthetic reference data for each of the epochs from the correction data for a synthetic station location, a cycle slip module operative to determine for each epoch whether a cycle slip has occurred in at least one of (i) the rover observations and (ii) observations at network stations used to prepare the correction data, a resetting module operative upon determination that a cycle slip has occurred to reset values of any variables of a set of state variables which are affected by the cycle slip while retaining values of at least some variables of the set which are not affected by the cycle slip, and an estimator module operative to use each epoch of rover observations and correction data to estimate updated values for the set of state variables, the state variables comprising a set of ambiguities and coordinates of a precise rover position.

In some embodiments, the correction data comprises at least one ionospheric-free cycle slip indicator per satellite for a plurality of satellites, the cycle slip module is operative to monitor the ionospheric-free cycle slip indicators to determine an identity of at least one satellite for which an ionospheric-free cycle slip has occurred, and the resetting module is operative to reset values of state variables affected by the ionospheric-free cycle slip.

In some embodiments, the correction data comprises at least one ionospheric cycle slip indicator per satellite per station of a network from which the correction data are derived, the cycle slip module is operative to monitor the ionospheric cycle slip indicators to determine an identity of at least one satellite-station pair for which an ionospheric cycle slip has occurred, and the resetting module is operative to reset state variables affected by the at least one ionospheric cycle slip.

In some embodiments, the estimator comprises a factorized array of recursive filters comprising a code-carrier filter bank using a Melbourne-Wuebbena code-carrier combination, an ionospheric filter bank using an ionospheric carrier combination, and a geometry filter using an ionospheric-free carrier combination.

In some embodiments, the resetting module is operative upon occurrence of an ionospheric-free cycle slip as to a specific satellite to reset the value of an ionospheric-free ambiguity state for the specific satellite in the geometry filter and the value of a widelane ambiguity state for the specific satellite in one of the code-carrier filters.

In some embodiments, the resetting module is operative upon occurrence of an ionospheric cycle slip as to a specific satellite to reset the value of an ionospheric ambiguity state for the specific satellite in one of the ionospheric filters.

In some embodiments, the resetting module is operative upon occurrence of a widelane cycle slip as to a specific satellite to reset the value of an ionospheric-free ambiguity state for the specific satellite in the geometry filter, reset the value of a widelane ambiguity state for the specific satellite in one of the code-carrier filters, and reset the value of an ionospheric ambiguity state for the specific satellite in one of the ionospheric filters.

In some embodiments, the estimator comprises a filter. In some embodiments, the resetting module is operative upon occurrence of an ionospheric-free cycle slip as to a specific satellite to reset the value of an ionospheric-free ambiguity state for the specific satellite in the filter. In some embodiments the resetting module is operative upon occurrence of an ionospheric cycle slip as to a specific satellite to reset the value of an ionospheric ambiguity state for the specific satellite in the filter.

Some embodiments provide for a computer program product comprising a tangible computer usable medium having computer readable instructions physically embodied therein, the computer readable instructions when executed by a processor enabling the processor to perform the method of one of the embodiments described herein.

According to an embodiment of the present invention, a computer program product is provided including a computer usable medium having computer readable instructions physically embodied therein, the computer readable instructions when executed by a processor enabling the processor to perform at least one of the methods of determining a precise position of a rover located within a region described herein.

According to another embodiment of the present invention, a computer program comprising a set of instructions which when loaded in and executed by a processor enable the processor to perform at least one of the methods of determining a precise position of a rover located within a region described herein.

According to yet another embodiment of the present invention, a non-transitory computer-readable storage medium is provided. The non-transitory computer-readable storage medium includes a plurality of computer-readable instructions tangibly embodied on the computer-readable storage medium, which, when executed by a data processor, provide a precise position of a rover located within a region. The plurality of instructions include instructions to perform the methods described herein.

BRIEF DESCRIPTION OF THE DRAWINGS

These and other aspects and features of the present invention will be more readily understood from the embodiments described below with reference to the drawings, in which.

DETAILED DESCRIPTION OF SPECIFIC EMBODIMENTS

Cycle Slip Detection & Repair

Figure 1:
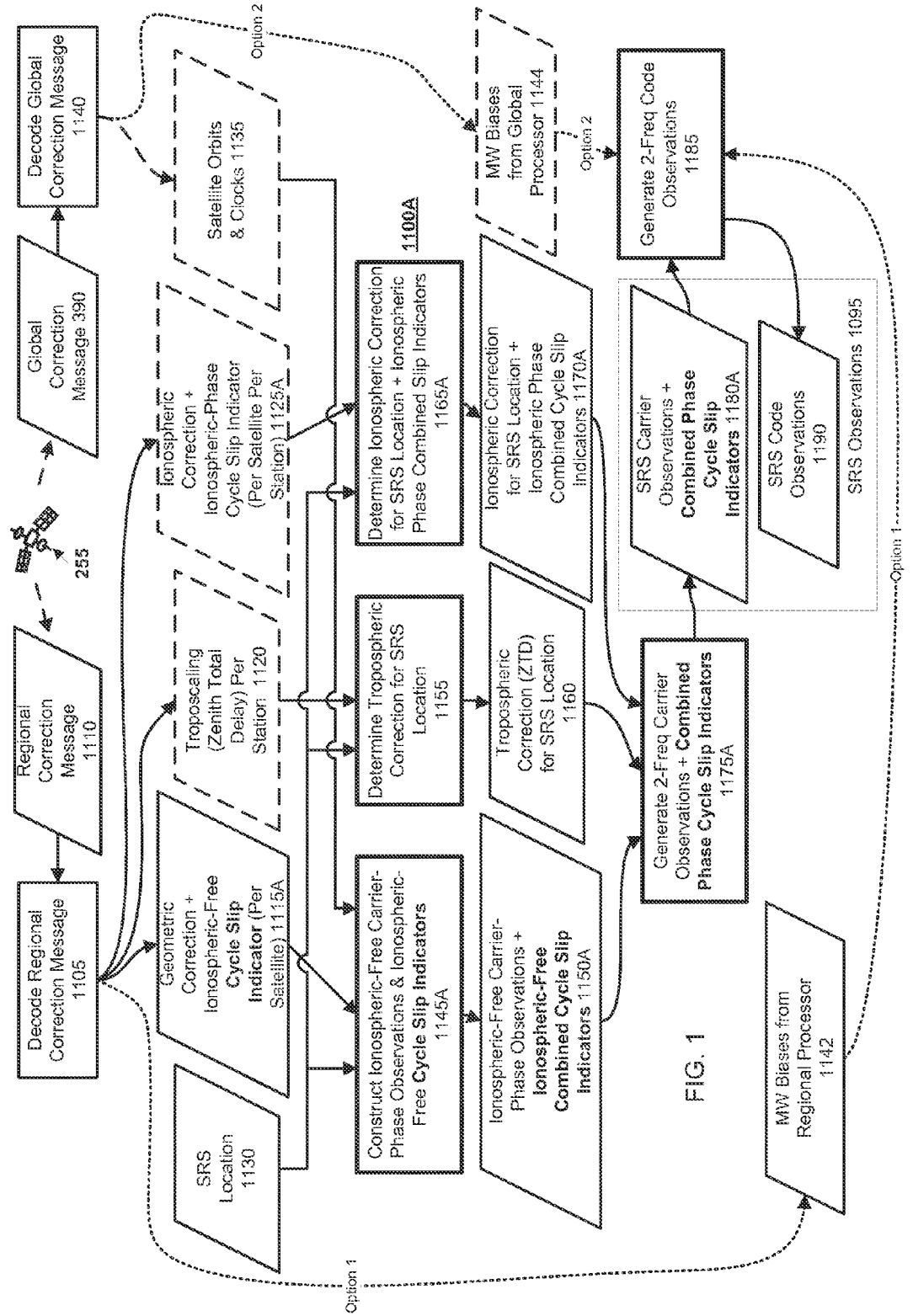
FIG. 1 schematically illustrates a scheme for generating synthetic reference station observations with cycle slip indicators in accordance with some embodiments of the invention.

GNSS carrier phase measurements have a precision of a few millimeters, however when satellite carrier tracking is commenced, the integer number of cycles between receiver and satellite is unknown. This gives rise to the so-called integer cycle ambiguity bias (sometimes called the integer ambiguity). So long as tracking to a satellite is maintained, the precise relative change in range between receiver and satellite can be measured. If tracking is interrupted, a cycle slip occurs and the number of integer cycles changes.

It is important to identify cycle slips when processing GNSS carrier phase observations. Failure to correctly deal with cycle slips in carrier phase data can lead to errors in the final computed positions.

Cycle slips can be detected in a number of ways:
Within the GNSS receiver tracking loops;
By analyzing various linear combinations of GNSS carrier phase and code phase data;
Studying the time-series of phase measurements.

Cycle Slip Detection in Receiver Tracking Loops

GNSS carrier phase tracking loops are closed at a high rate—e.g. every millisecond. A third-order tracking loop is able to model the variation of the GNSS carrier phase measurements for most dynamic applications. The predicted residuals from the tracking loops are monitored for outliers and discontinuities caused by cycle slips. Cycle slips can also be detected in tracking loops by monitoring the Carrier-to-Noise-Ratio, which tends to drop when tracking has been interrupted. GNSS receivers designed for high-precision applications have a low probability of missed detection of cycle slips.

Cycle slips detected in the tracking loops are flagged and presented with GNSS observations for real-time and post-processing applications. A rover RTK receiver relies on the tracking loops to detect and flag discontinuities within the rover data.

Cycle Slip Detection Via GNSS Observations

A detailed description of various cycle slips detection/repair methods can be found in Hofmann-Wellenhof, 2001, GPS Theory and Practice, Springer, $5^{th}$ Ed, ISBN 3-211-83534-2, see section 9.1.2 "Cycle slip detection and repair". Some of the techniques are based around linear combinations of carrier phase and code data. Other techniques are based just on the time-wise variation of carrier phase measurements.

In static applications such as for network reference receivers, carrier phase data has a relatively smooth behavior that lends well to the detection and repair of cycle slips. In the case of a regional GNSS network, discontinuities in the ionospheric-free phase and satellite code biases caused by cycle slips can be repaired by the network server software before corrections are broadcast. Any cycle slips that cannot be repaired are flagged in the corrections.

Cycle Slip Indicators

Cycle slip indicators are used with conventional carrier phase data to indicate the presence of interruptions to continuous tracking on a particular satellite and frequency band. Cycle slip indicators can take several forms:

Flag (slip occurred, no slip occurred);
Counter, incremented each time there is a cycle slip;
Continuity time counter, i.e. how long phase has been continuously tracked.

A simple two-state cycle slip flag has the disadvantage that it is ambiguous when there is a possibility of missing data. A cycle slip counter reduces (or effectively eliminates) the possibility of missed cycle slip events. A user of a cycle slip counter simply has to compare the last stored cycle slip counter with the current cycle slip counter to determine if there has been a discontinuity in the carrier tracking. A continuity time count (CTC) uses a predefined number of states to indicate how long continuous tracking has been maintained. An example is given in Table 1.

TABLE 1

Example of Continuity Time Counter state meanings.

| State | Meaning |
| --- | --- |
| 0 | Cycle slip at current epoch |
| 1 | Phase tracking continuous for 1 second |
| 2 | Phase tracking continuous for 2 seconds |
| 3 | Phase tracking continuous for 4 seconds |
| 4 | Phase tracking continuous for 8 seconds |

In the context of synthetic reference station (SRS) data, carrier phase is modeled in terms of ionospheric-free (geometric) and ionospheric combinations, rather than in the original GNSS frequency bands such as L1 and L2. These combinations are referred to herein as combined phase. It is convenient to monitor continuity in the ionospheric-free and ionospheric phase combinations when dealing with SRS data. That is, combined phase cycle slip indicators are useful for marking changes in the ionospheric-free phase level and ionospheric phase level. Changes in the ionospheric phase level tend to occur more frequently than changes in the ionospheric-free phase level in SRS data. RTK processing algorithms used to estimate rover position can exploit the combined phase cycle slip indicators in the processing algorithms in order to maximize positioning accuracy and availability.

Overview of Regionally Augmented GNSS

A detailed description of regionally augmented GNSS is found in Provisional U.S. Application for Patent 61/337,980. A central component of the SRS processing system is the SRS Module. The SRS Module transforms the regional network correction stream into a synthetic reference station data stream that can be used by a rover for differential processing.

FIG. 1 shows an enhanced version of FIG. 11 of Provisional U.S. Application for Patent 61/337,980, illustrating data flow in the SRS module including the combined-phase cycle slip indicators. Like elements are indicated by like reference numerals.

Discontinuities in the network ionospheric-free (geometric) phase corrections are signaled by cycle slip indicators in the correction message, e.g., as described in Part 5 of Provisional U.S. Application for Patent 61/337,980. The ionospheric-free phase cycle slip indicators (one per satellite) are decoded and stored with the geometric corrections at 1115A. The ionospheric phase corrections together with cycle slip indicators (one per satellite per network station) are also decoded and stored at 1125A for each satellite at each station in the network. The cycle slip indicators flow through the SRS module during the generation of the synthetic reference station observation data stream. That is, the decoded cycle slip indicators for the ionospheric-free (geometric) corrections at 1115A are passed through during construction of ionospheric-free carrier-phase observations at 1145A with the constructed ionospheric-free carrier-phase observations at 1150A, and are passed through during generation of two-frequency carrier observations at 1175A with the SRS carrier observations 1180A.

The ionospheric-free carrier-phase observations per satellite are continuous quantities from the entire network of stations; these provide for accurate satellite orbit and clock information and do not suffer from interruption of reception of a satellite at an individual network station since observations of the same satellite at other network stations are used in network processing to maintain continuity of the geometric correction per satellite.

The decoded cycle slip indicators for the ionospheric phase corrections at 1125A are passed through during determination of the ionospheric correction for the SRS location at 1165A with the ionospheric correction for the SRS location at 1170A, and are passed through during generation of two-frequency carrier observations at 1175A with the SRS observations 1180A. The SRS observations 1180A with combined phase cycle clip indicators are used in processing of rover observations to estimate rover position.

Combined Phase Slip Indicators

Various linear combinations of the original L1, L2, etc. code and phase data are utilized in the network processing scheme in order to help isolate specific components of the errors affecting the GNSS satellite signals. For example wide-lane carrier phase is processed with narrow-lane code data in the so-called Melbourne-Wübbena (MW) code/phase combination in order to estimate code biases on each satellite tracked. The wide-lane phase combination is given as:

$$L_w = \left[\frac{L_1}{\lambda_1} - \frac{L_2}{\lambda_2}\right]\lambda_w \tag{1}$$

where:
$L_1$ L1 phase observation in units of meters;
$L_2$ L2 phase observation in units of meters;
$\lambda_1$ L1 carrier wavelength;
$\lambda_2$ L2 carrier wavelength;
$\lambda_w$ Wide-lane carrier wavelength;
$L_w$ Wide-lane phase observation in units of meters.

The phase-leveled geometric correction terms are derived from ionospheric-free carrier phase ($L_c$) data:

$$L_c = \left(\frac{\lambda_2^2}{\lambda_2^2 - \lambda_1^2}\right)L_1 + \left(\frac{-\lambda_1^2}{\lambda_2^2 - \lambda_1^2}\right)L_2 \tag{2}$$

The phase-leveled geometric correction terms contain residual satellite orbit and clock errors plus residual tropospheric biases. Importantly the integer nature of the carrier phase data is maintained within the phase-leveled geometric correction.

The ionospheric delay for each satellite/station is derived from the ionospheric phase combination ($L_I$):

$$L_I = \left(\frac{-\lambda_1^2}{\lambda_2^2 - \lambda_1^2}\right) L_1 + \left(\frac{\lambda_1^2}{\lambda_2^2 - \lambda_1^2}\right) L_2 \quad (3)$$

The ionospheric correction gives the bias in the signal due to the dispersive effect of the ionosphere along a particular satellite-to-station signal path.

A single code bias correction is broadcast for each satellite in the network. That is, code biases are not dependent on continuous phase tracking at any particular tracking station. The phase-leveled geometric correction terms are computed for each satellite as a best-fit across the regional network. Thus, continuous phase tracking at a particular tracking station should not impact on the apparent geometric correction terms for each satellite.

The ionospheric delay terms are specific to each station and satellite pairing. If a cycle slip occurs on L1 and/or L2 on a particular satellite for a physical reference station there will be a discontinuity in the ionospheric delay correction for that satellite-station pairing. Rover processing typically uses the ionospheric correction data for the network station nearest the rover, or a correction interpolated from ionospheric correction data from network stations nearest the rover.

The combined phase slip indicators are used to announce discontinuities in a particular phase combination. In the context of regional GNSS augmentation, the combined phase slip indicators are used with ionospheric-free (geometric) and ionospheric corrections. Combined phase slip indicators are optionally also used to announce discontinuities in the code-bias corrections, however normally the code-biases are readily maintained at a constant level across the entire network.

Using Combined Phase Slip Indicators at the Rover

FIG. 8 and FIG. 9 of Provisional U.S. Application for Patent 61/337,980 schematically illustrate differential processing of regionally augmented GNSS data. The SRS module (SRS module 855 at the rover side in FIG. 8 or SRS module 955 at a processor remote from the rover in FIG. 9) constructs synthetic reference station data based on corrections received from the network. A virtual reference station location, such as the approximate current location of the rover, is used in the SRS module for interpolation of the corrections. The synthetic reference station (SRS) data simulates data obtained from a physical reference station. SRS code and carrier phase observations for each satellite are given in terms of their fundamental frequency bands, i.e., L1, L2, etc. Similarly cycle slips are indicated for the fundamental frequencies (L1, L2, etc.). Typically cycle slips are indicated by cycle slip indicators associated with each satellite and each frequency band.

Ionospheric errors are spatially correlated and therefore it is advantageous for the rover receiver to use ionospheric correction information from the nearest physical reference station or stations in the network. Use of the nearest physical reference station or stations helps to reduce the impact of ionospheric errors in rover processing.

If the network connection to one or more reference stations whose ionospheric corrections are being used by a rover is interrupted, or if the rover moves away from one reference station and closer to another, it is advantageous to change the selection of physical reference station or set of stations to another. A switch in the physical reference station source can result in a change (discontinuity) in the ionospheric bias level for each satellite used in processing the rover data. However the ionospheric-free phase and code-bias corrections could remain constant during a switch in the physical reference station selection.

SRS Data Processing with Factorized Filters

Figure 2:
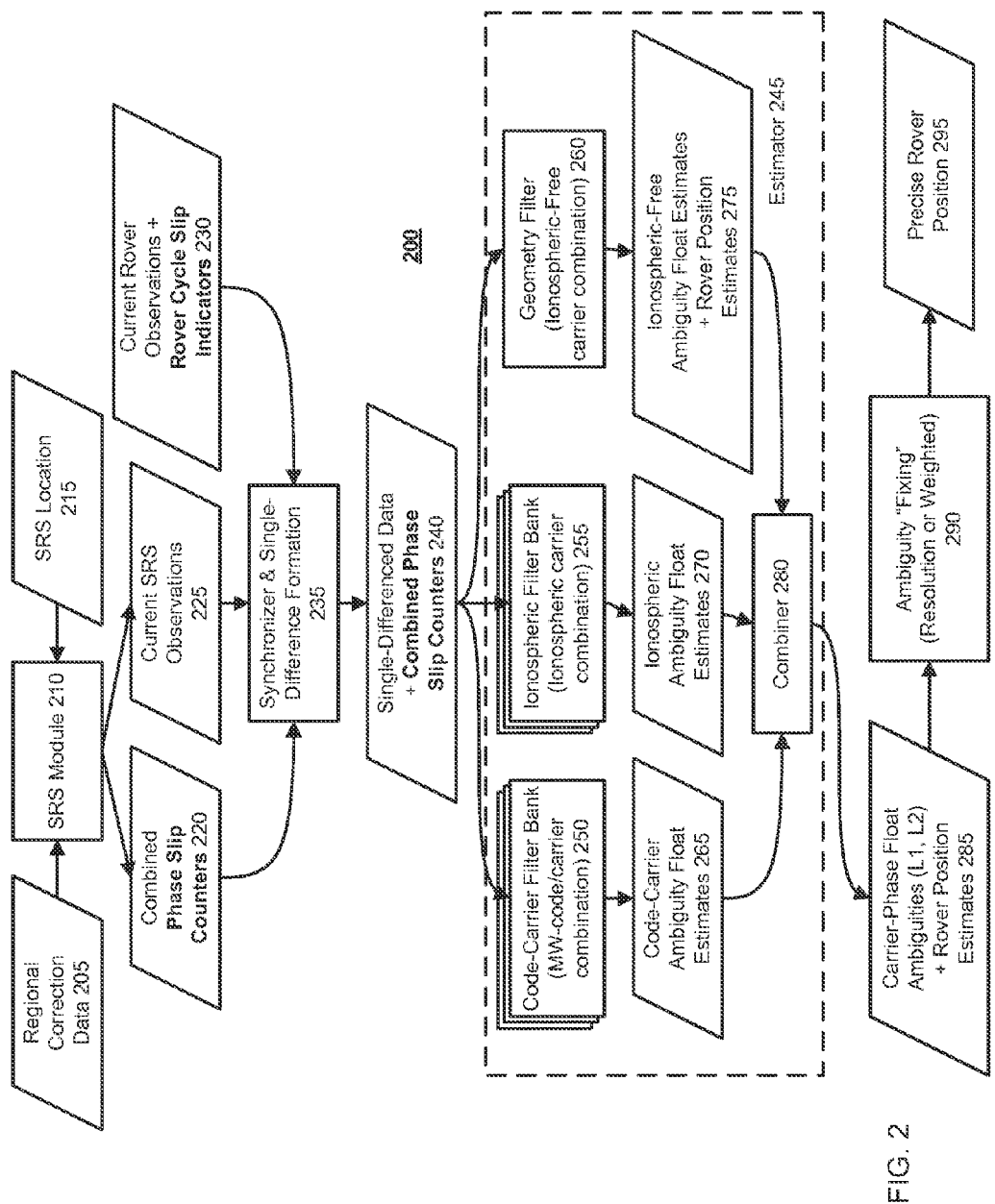
FIG. 2 schematically illustrates a factorized processing scheme for determining a precise rover position in accordance with some embodiments of the invention.

FIG. 2 schematically illustrates at 200 an example of rover SRS data processing architecture with a factorized array of filters, e.g., using techniques described in U.S. Pat. No. 7,432,853. The factorized-array technique reduces computational burden by distributing the estimation of position/ambiguity states across multiple filters and subsequently combining the results.

Regional correction data 205 and the SRS location 215 are used by SRS module 210 to generate combined phase slip counters 220 and synthetic reference station observations 225 for each epoch. Construction of SRS observations is described in Part 2.3 of Provisional U.S. Application for Patent 61/337,980. At 235 the rover observations 230 are synchronized (matched by epoch) and single-differenced with the SRS observations 225. The single-differenced data with combined phase slip counters are provided at 240 to an estimator 245. Estimator 245 includes a code-carrier filter bank 250, an ionospheric filter bank 255 and a geometry filter 260. The estimator 245 framework is responsible for analyzing the combined cycle slip counters and triggering the proper state resets in each of its filters, code-carrier filter bank 250, an ionospheric filter bank 255 and a geometry filter 260.

Whenever cycle slips are indicated by means of a counter change, or a Boolean indicator the filters that are affected by the phase combination which the slip refers to reset the proper states. The affected filters can comprise one or more of Code-carrier Filter Bank 250, Ionospheric Filter Bank 255, and Geometry Filter 260.

Code-carrier filter bank 250 can process wide-lane phase and narrow-lane code observations (the MW code-carrier combination matching the code/carrier combination used in the regional network server) or other types of combination between code and carrier measurements to estimate float values for the code-carrier ambiguities 265. The SRS data is generated in such a way that the different possible types of combination between code and carrier measurements are consistent (i.e., free of biases after the single-difference observation is formed) between the rover and the network corrections generated by the server.

Ionospheric filter bank 255 uses the same ionospheric phase combination as used by the regional network server, to estimate float values for the ionospheric ambiguities 270. The ionospheric combination is formed according to equation (2) and similarly as for the code-carrier filter bank, the SRS data is generated in such a way that the ionospheric carrier measurements are consistent (i.e., free of biases after the single-difference observation is formed) between the rover and the network corrections generated by the server.

Geometry filter 260 processes ionospheric-free phase data matching the phase-leveled geometric corrections from the regional network, to estimate float values for the ionospheric-free (geometric) ambiguities and a rover position estimate at each epoch 275. This filter is responsible for estimating the rover position at a first instance, and also to generate the relationship between ambiguities and position states, which can be later used to derive positions based on ambiguities of integer nature that are generated during the Ambiguity "Fixing" step 290. The rover-server consistency statement made before also applies to this filter, what means that the SRS data is generated in such a way that the ionospheric-free carrier measurements are consistent (i.e., free of biases after the single-difference observation is formed) between the rover and the network corrections generated by the server.

The factorized filter estimates 265, 270 and 275 are combined in a combiner 280 to provide for each epoch of data processed a set of estimates 285 for the carrier-phase float ambiguities of the GNSS carrier frequencies (e.g., L1, L2) and rover position estimates. These ambiguities are then "fixed" by either resolving their integer values using conventional techniques or forming weighted combinations of integer-value candidate sets as described for example in International Patent Publication Number WO 2010/021660 A3. The terms "fix" and "fixed" and "fixing" in quotation marks are intended to encompass either resolving integer values or forming such weighted combinations of integer values. The "fixed" ambiguities are used to determine a precise rover position 295 for each epoch of processing.

Following is an example of state descriptions for the factorized component filters for SRS data processing:

$$x_{geom} = [X\ Y\ Z\ T\ \ldots\ N_c^1\ N_c^2\ \ldots\ N_c^i\ \ldots\ N_c^s\ m_c^1\ m_c^2\ \ldots\ m_c^i\ \ldots\ m_c^s]^T \quad (4)$$

$$x_{code}^i = [N_W^i\ m_W^i]^T \quad (5)$$

$$x_{iono}^i = [N_I^i\ m_I^i\ \alpha_I^i\ \beta_I^i]^T \quad (6)$$

where:
- $x_{geom}$ state vector for the geometry filter;
- X,Y,Z rover position coordinates;
- T single-difference clock parameter;
- $N_c^i$ ionospheric-free carrier-phase ambiguity term for the $i^{th}$ satellite;
- $m_c^i$ ionospheric-free carrier phase multipath term for the $i^{th}$ satellite;
- $x_{code}^i$ code-carrier filter state vector for the $i^{th}$ satellite;
- $N_W^i$ wide-lane carrier phase ambiguity term for the $i^{th}$ satellite;
- $m_W^i$ multipath term for the $i^{th}$ satellite filter;
- $x_{iono}^i$ ionospheric filter state vector for the $i^{th}$ satellite;
- $N_I^i$ ionospheric ambiguity for the $i^{th}$ satellite;
- $m_I^i$ ionospheric multipath term for the $i^{th}$ satellite;
- $\alpha_I^i, \beta_I^i$ physical ionospheric model parameters for the $i^{th}$ satellite.

The ambiguity and position estimates of the filters converge with processing of many epochs of SRS and rover data. The code-carrier filters converge relatively quickly (over a few tens of seconds), whereas the geometry filter is slow to converge (for example over 5-20 minutes). Convergence of the ionospheric filters is very much dependent on how close the rover is to the physical reference station or stations whose ionospheric corrections are being used, i.e. how well the ionospheric bias can be constrained. Convergence of the ionospheric filters has been found to take from a few seconds to a few tens of seconds with corrections from one regional augmentation network.

Consider a situation where a physical reference station whose corrections are used in rover processing is disconnected from the network. The SRS module must switch to using corrections from another physical reference station and adapt the SRS stream used in processing rover observations. In this case, the SRS module increments the L1 and L2 cycle slip indicators on every satellite beginning with the epoch in which the new physical reference station data is used in the SRS stream. Importantly, the combined cycle slip indicators for the ionospheric-free phase will remain unchanged; while the ionospheric phase cycle slip indicators will increment for every satellite.

Occasionally cycle slips will occur on one or more satellites at physical reference stations. The ionospheric phase cycle slip indicator for the offending satellite will in this case increment in the SRS module, while the ionospheric-free phase will remain uninterrupted.

Table 2 summarizes the events and their possible corresponding cycle slips.

TABLE 2

Effect of regional physical reference station change and single satellite tracking interruption on fundamental band slip indicators and combined phase cycle slip indicators.

| Event | L1 Slip | L2 Slip | Ionospheric-free Phase Slip | Ionospheric Phase Slip |
|---|---|---|---|---|
| Physical reference station selection used by rover is changed | All satellites | All satellites | None | All satellites |
| Cycle slip on a single satellite on physical reference station used by the rover | Offending satellite | Offending satellite | None | Offending satellite |

Figure 3:
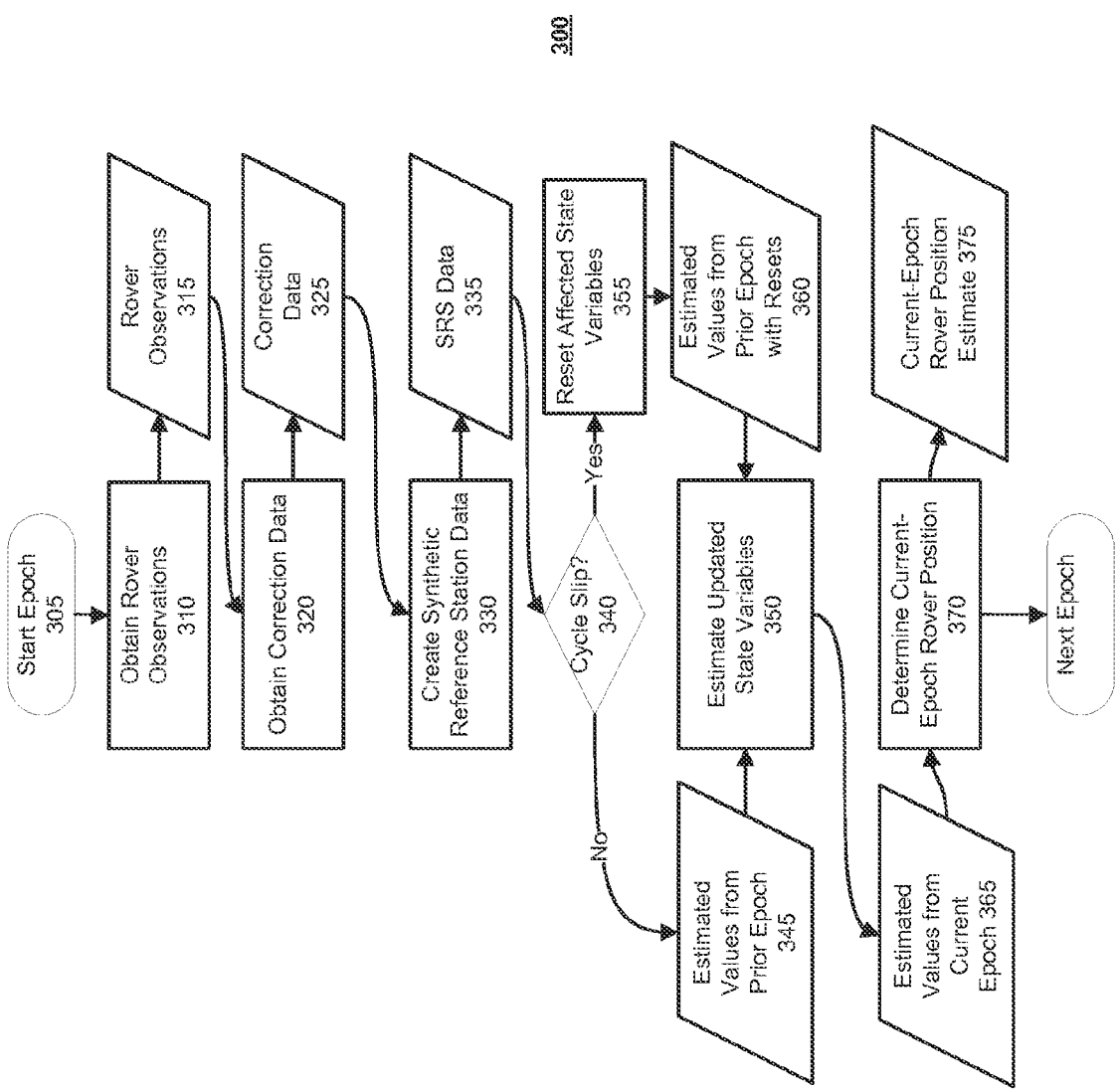
FIG. 3 schematically illustrates a process flow for estimating rover position in accordance with some embodiments of the invention.

FIG. 3 schematically illustrates a method 300 for determining a precise position of a rover located within a region, according to one embodiment of the invention. The method comprises, starting at a given start epoch 305, a step of obtaining 310 rover observations 315 comprising code observations and carrier-phase observations of GNSS signals on at least two carrier frequencies over multiple epochs. The method further comprises a step of receiving 320, or obtaining, correction data 325 comprising, for each of the epochs at least one code bias per satellite, at least one of: (i) a fixed-nature Melbourne-Wübbena (MW) bias per satellite and (ii) values from which a fixed-nature MW bias per satellite is derivable, and at least one of: (iii) an ionospheric delay per satellite for each of multiple regional network stations, and (iv) non-ionospheric corrections. The method yet further comprises a step of creating 330 synthetic reference data 335 for each of the epochs from the correction data for a synthetic station location. Then, the method comprises a step of determining 340 for each epoch whether a cycle slip has occurred in at least one of (i) the rover observations and (ii) observations at network stations used to prepare the correction data. Upon determining that a cycle slip has occurred ("Yes" after step 340 on FIG. 3), the method comprises resetting 355 values of any variables of a set of state variables which are affected by the cycle slip while retaining values of at least some variables of the set which are not affected by the cycle slip. Upon determining that a cycle slip has not occurred ("No" after step 340 on FIG. 3), the method comprises retaining values of all variables of the set 345. Then, the method includes: using each epoch of rover observations and correction data to estimate 350 updated values for the set of state variables for the current epoch 365, the state variables comprising a set of ambiguities, which are then used to determine 370 coordinates of a precise rover position 375.

Consequence of Various Cycle Slips on Rover Processing

Table 3 summarizes the effect of different types of cycle slips on each filter component used in the factorized-filter processing of FIG. 2. By default, a cycle slip on L1 or L2 on a particular satellite will result in the corresponding satellite ambiguity state being reset in all of the FAMCAR component filters. Hence without combined cycle slip information, certain filters may be unnecessarily reset when just L1 and L2 cycle slip indicators are available.

Notice that in the case of a slip in the ionospheric-free phase, the geometry filter and code-carrier filter are affected, while the ionospheric filter is unaffected. Cycle slips in the ionospheric-free phase combination are normally obviated in the case of regional network augmentation (see WO 2011/126605 A2, published on 13 Oct. 2011, TNL A-2633PCT), it is more likely that there are discontinuities in the ionospheric-phase for a particular satellite and station. Importantly, the more common ionospheric phase cycle slips do not affect either the geometry filter or the code-carrier filter components.

on a physical reference station means that the corresponding ionospheric filter must reset and reconverge. The overall rover position and ambiguity solution quality can still be maintained so long as the geometry filter has converged sufficiently and is not reset.

Figure 4:
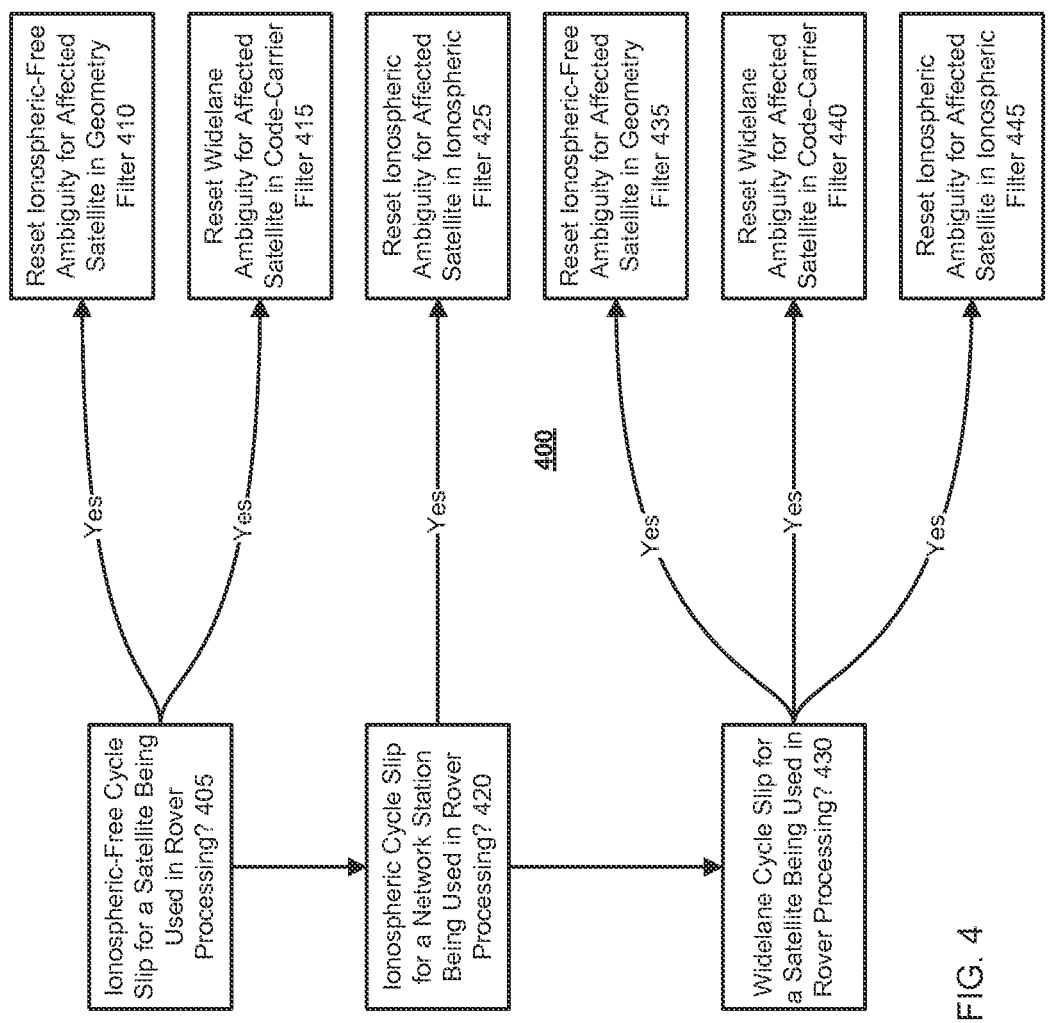
FIG. 4 schematically illustrates a process for resetting values of state variables of a factorized filter array in accordance with some embodiments of the invention.

FIG. 4 schematically illustrates a process for resetting values of state variables of a factorized filter array in accordance with some embodiments of the invention. When processing the rover data, different combinations of cycle slip are checked. If an ionospheric-free cycle slip is set for a satellite being used for the rover data processing 405, the ionospheric-free ambiguity of the affected satellite is reset in the geometry filter 410, and the wide-lane ambiguity of the affected satellite is reset in the code-carrier filter 415. If an ionospheric cycle slip is set for a satellite being used for the rover data processing 420, the ionospheric ambiguity of the affected satellite is reset in the ionospheric filter 425. If an wide-lane cycle slip is set for a satellite being used for the rover data processing 430, the ionospheric-free ambiguity of the affected satellite is reset in the geometry filter 435, the wide-lane ambiguity of the affected satellite is reset in the code-carrier filter 440, and the ionospheric ambiguity of the affected satellite is reset in the ionospheric filter 445.

SRS Data Processing Using a Big Filter Approach

Instead of using the FAMCAR processing technique for SRS data processing, the rover location and ambiguity terms can be estimated using a classical big-filter approach. In the big-filter approach, the following state vector would be suited to SRS data processing:

$$x = [X\ Y\ Z\ T\ N_c^1\ N_I^1\ N_c^2\ N_I^2\ \ldots\ N_c^s\ N_I^s\ I^1\ I^2\ \ldots\ I^s\ \beta_k^i\ \ldots\ b_k^i\ \ldots]^T \quad (7)$$

Where:
x state vector for the big-filter;
X, Y, Z rover position coordinates;

TABLE 3

Consequence of different types of cycle slips on factorized filter components. The ambiguity states ($N^i$) of the various filters are reset as a result of cycle slips on a satellite i.

| Cycle Slip Type | Geometry Filter (using iono-free phase) | Code-Carrier Filter (using wide-lane phase & narrow-lane code) | Ionospheric Filter (using ionospheric phase) |
|---|---|---|---|
| L1 | Reset $N_c^i$ | Reset $N_W^i$ | Reset $N_I^i$ |
| L2 | Reset $N_c^i$ | Reset $N_W^i$ | Reset $N_I^i$ |
| Ionospheric-Free | Reset $N_c^i$ | Reset $N_W^i$ | No Effect |
| Ionospheric | No Effect | No Effect | Reset $N_I^i$ |
| Wide-Lane | Reset $N_c^i$ | Reset $N_W^i$ | Reset $N_I^i$ |

The geometry filter ambiguity states are only reset if there is a change to the ionospheric-free cycle slip indicator. The single-difference ionospheric phase is sensitive to tracking interruptions on a physical reference station in use by the rover. A slip in the ionospheric phase for a particular satellite T single-difference clock parameter;
$N_c^i$ Ionospheric-free carrier-phase ambiguity term for the $i^{th}$ satellite;
$N_I^i$ Ionospheric carrier-phase ambiguity term for the $i^{th}$ satellite;

$I^i$ ionospheric bias term for the $i^{th}$ satellite;

$\beta_k^i$ code bias term for the $i^{th}$ satellite and $k^{th}$ frequency band, $b_k^i$ carrier phase bias term for the $i^{th}$ satellite and $k^{th}$ frequency band.

The rover position coordinates (X, Y, Z) are of primary interest for SRS positioning applications. The remaining carrier phase ambiguity terms, ionospheric bias term, code and carrier multipath terms, etc. are considered as nuisance parameters. The ambiguity unknowns are cast in terms of ionospheric-free and ionospheric linear combinations to match the phase combinations used on the regional network correction generator.

A cycle slip on a particular carrier phase band or combined phase band leads requires a reset of the corresponding ambiguity state as shown in Table 4.

TABLE 4

Consequence of different types of cycle slips on ambiguity states in a Big-Filter.

| Cycle Slip Type | Ionospheric-Free Ambiguity State $N_c^i$ for satellite i | Ionospheric Ambiguity State $N_I^i$ for satellite i |
| --- | --- | --- |
| L1 | Reset | Reset |
| L2 | Reset | Reset |
| Ionospheric-Free | Reset | No Effect |
| Ionospheric | No Effect | Reset |
| Wide-Lane | Reset | Reset |

Correlations develop between the state parameters in the big-filter as data is applied. Reconvergence of the filter states will be faster after a cycle slip event if just the minimum ambiguity states are reset. Hence there is an advantage in using the combined cycle slip indicators versus slip indicators on the fundamental L1 & L2 bands.

Figure 5:
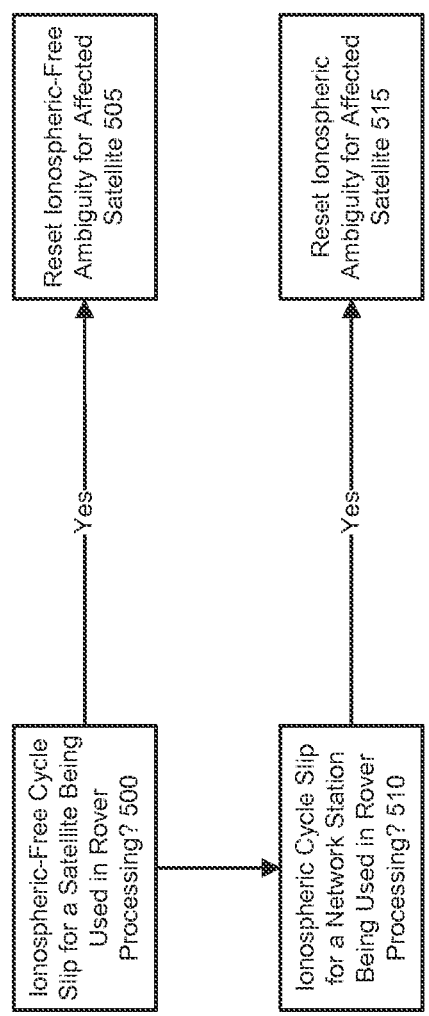
FIG. 5 schematically illustrates a process for resetting values of state variables of a large filter in accordance with some embodiments of the invention.

FIG. 5 schematically illustrates a process for resetting values of state variables of a large filter in accordance with some embodiments of the invention. If an ionospheric-free cycle slip is set for a satellite being used for the rover data processing 500, the ionospheric-free ambiguity of the affected satellite is reset 505. If an ionospheric cycle slip is set for a satellite being used for the rover data processing 510, the ionospheric ambiguity of the affected satellite is reset in the ionospheric filter 515.

Part 6 of Provisional U.S. Application for Patent 61/337,980 describes receiver and processing apparatus in which the above-described processing can be carried out.

The detailed description of embodiments of the present invention is illustrative only and is not intended to be in any way limiting. Other embodiments will readily suggest themselves to such skilled persons having the benefit of this disclosure.

In the interest of clarity, not all of the routine features of the implementations described herein are shown and described. In the development of any such actual implementation, numerous implementation-specific decisions must be made to achieve the developer's specific goals, such as compliance with application- and business-related constraints, and that these specific goals will vary. Such a development effort might be complex and time-consuming, but would nevertheless be a routine undertaking of engineering for those of ordinary skill in the art having the benefit of this disclosure.

In accordance with embodiments of the present invention, the components, process steps and/or data structures may be implemented using various types of operating systems (OS), computer platforms, firmware, computer programs, computer languages and/or general-purpose machines. The methods can be run as a programmed process running on processing circuitry. The processing circuitry can take the form of numerous combinations of processors and operating systems, or a stand-alone device. The processes can be implemented as instructions executed by such hardware, by hardware alone, or by any combination thereof. The software may be stored on a program storage device readable by a machine. Computational elements, such as filters and banks of filters, can be readily implemented using an object-oriented programming language such that each required filter is instantiated as needed.

Devices of a less general-purpose nature, such as hardwired devices, field programmable logic devices (FPLDs), including field programmable gate arrays (FPGAs) and complex programmable logic devices (CPLDs), application specific integrated circuits (ASICs), or the like, may also be used without departing from the scope and spirit of the inventive concepts disclosed herein. Some embodiments take as the SRS location the autonomously-determined position of the rover. Some embodiments take as the SRS location an approximate rover location obtained from one or more alternate position sources, such as a rover position determined by an inertial navigation system (INS) collocated with the rover, the position of a mobile phone (cell) tower in proximity to a rover collocated with a mobile telephone communicating with the tower, user input such as a location entered manually by a user for example with the aid of keyboard or other user input device, or any other desired source of an SRS location.

Embodiments described herein using factorized filters or a single big filter can be implemented using a variety of processing techniques, such as Kalman filtering, Least Squares estimation, and robust estimation.

The usage of the cycle slip indication is not restricted to combinations between L1 and L2 frequencies, and the same concept can be applied to combinations between other frequencies (such as GPS L5) and also for combinations between 3 or more frequencies, such as between GPSL1, GPSL2, GPSL5.

The usage of the cycle slip indication is not restricted to combinations of measurements of the GPS system, and the same concept can be applied to combinations of phase measurements from other satellite systems, such as QZSS, GLONASS, Galileo, COMPASS.

What is claimed is:

1. A method of determining, using a processor, a position of a rover, the method comprising:

obtaining rover observations comprising code observations and carrier-phase observations of GNSS signals on at least two carrier frequencies over multiple epochs;

receiving correction data comprising for each of the epochs at least one code bias per satellite, the code bias comprising at least one of: (i) a fixed-nature MW bias per satellite or (ii) values from which a fixed-nature MW bias per satellite is derivable, the correction data further comprising at least one of: (iii) an ionospheric delay per satellite for each of multiple regional network stations, (iv) non-ionospheric corrections, or (v) information on the corrections continuity for one or more correction components;

applying the correction data to the rover observations using one of (i) creating synthetic reference data for each of the epochs from the correction data for a synthetic station location or (ii) directly correcting the rover observations;

determining for each epoch whether an ionospheric cycle slip has occurred in at least one of (i) the rover observations or (ii) observations at the regional network stations used to prepare the correction data;

upon determining that an ionospheric cycle slip has occurred, resetting values of state variables affected by the ionospheric cycle slip and retaining values of state variables not affected by the ionospheric cycle slip; and estimating updated values for a set of state variables using each epoch of the rover observations and the correction data, the set of state variables including the state variables affected by the ionospheric cycle slip and the state variables not affected by the ionospheric cycle slip.

2. The method of claim 1, wherein the correction data comprises at least one ionospheric cycle slip indicator per satellite per regional network station, and wherein determining whether an ionospheric cycle slip has occurred comprises monitoring the ionospheric cycle slip indicators to determine an identity of at least one satellite-station pair for which an ionospheric cycle slip has occurred.

3. The method of claim 1, wherein estimating updated values for the set of state variables comprises applying a factorized array of recursive filters, the factorized array of recursive filters comprising a code-carrier filter bank using a Melbourne-Wuebbena code-carrier combination, an ionospheric filter bank using an ionospheric carrier combination, and a geometry filter using an ionospheric-free carrier combination.

4. The method of claim 3, wherein the correction data comprises at least one ionospheric cycle slip indicator per satellite, wherein determining that an ionospheric cycle slip has occurred comprises monitoring the ionospheric cycle slip indicators to identify an ionospheric cycle slip as to a specific satellite, and wherein resetting values of the state variables affected by the ionospheric cycle slip comprises resetting a value of an ionospheric ambiguity state for the specific satellite in the ionospheric filter bank.

5. The method of claim 1, wherein estimating updated values for the set of state variables comprises applying a filter.

6. The method of claim 5, wherein the correction data comprises at least one ionospheric cycle slip indicator per satellite, wherein determining that an ionospheric cycle slip has occurred comprises monitoring the ionospheric cycle slip indicators to identify an ionospheric cycle slip as to a specific satellite, and wherein resetting values of the state variables affected by the ionospheric cycle slip comprises resetting a value of an ionospheric ambiguity state for the specific satellite in the filter.

7. An apparatus for determining a position of a rover using rover observations and correction data, the rover observations comprising code observations and carrier-phase observations of GNSS signals on at least two carrier frequencies over multiple epochs, the correction data comprising for each of the epochs at least one code bias per satellite, the code bias comprising at least one of: (i) a fixed-nature MW bias per satellite or (ii) values from which a fixed-nature MW bias per satellite is derivable, the correction data further comprising at least one of: (iii) an ionospheric delay per satellite for each of multiple regional network stations, or (iv) non-ionospheric corrections, the apparatus comprising:

a synthetic reference station (SRS) module operative to create synthetic reference data for each of the epochs from the correction data for a synthetic station location;

a cycle slip determination module operative to determine for each epoch whether an ionospheric cycle slip has occurred in at least one of (i) the rover observations or (ii) observations at the regional network stations used to prepare the correction data;

a resetting module operative upon determining that an ionospheric cycle slip has occurred to reset values of state variables affected by the ionospheric cycle slip and retaining values of state variables not affected by the ionospheric cycle slip; and an estimator module operative to estimate updated values for a set of state variables using each epoch of the rover observations and the correction data, the set of state variables including the state variables affected by the ionospheric cycle slip and the state variables not affected by the ionospheric cycle slip.

8. The apparatus of claim 7, wherein the correction data comprises at least one ionospheric cycle slip indicator per satellite per regional network station, and wherein the cycle slip determination module is operative to monitor the ionospheric cycle slip indicators to determine an identity of at least one satellite-station pair for which an ionospheric cycle slip has occurred.

9. The apparatus of claim 7, wherein the estimator module comprises a factorized array of recursive filters, the factorized array of recursive filters comprising a code-carrier filter bank using a Melbourne-Wuebbena code-carrier combination, an ionospheric filter bank using an ionospheric carrier combination, and a geometry filter using an ionospheric-free carrier combination.

10. The apparatus of claim 9, wherein resetting values of the state variables affected by the ionospheric cycle slip comprises resetting a value of an ionospheric ambiguity state for the specific satellite in the ionospheric filter bank.

11. The apparatus of claim 7, wherein the estimator module comprises a filter.

12. The apparatus of claim 11, wherein resetting values of the state variables affected by the ionospheric cycle slip comprises resetting a value of an ionospheric ambiguity state for the specific satellite in the filter.

13. A method of determining, using a processor, a position of a rover, the method comprising:

obtaining rover observations comprising code observations and carrier-phase observations of GNSS signals on at least two carrier frequencies over multiple epochs;

receiving correction data comprising for each of the epochs at least one code bias per satellite, the code bias comprising at least one of: (i) a fixed-nature MW bias per satellite or (ii) values from which a fixed-nature MW bias per satellite is derivable, the correction data further comprising at least one of: (iii) an ionospheric delay per satellite for each of multiple regional network stations or (iv) non-ionospheric corrections;

applying the correction data to the rover observations using one of (i) creating synthetic reference data for each of the epochs from the correction data for a synthetic station location, or (ii) directly correcting the rover observations;

determining for each epoch whether an ionospheric-free cycle slip has occurred in at least one of (i) the rover observations, or (ii) observations at the regional network stations used to prepare the correction data;

upon determining that an ionospheric-free cycle slip has occurred, resetting values of state variables affected by the ionospheric-free cycle slip and retaining values of state variables not affected by the ionospheric-free cycle slip; and estimating updated values for a set of state variables using each epoch of the rover observations and the correction data, the set of state variables including the state variables affected by the ionospheric-free cycle slip and the state variables not affected by the ionospheric-free cycle slip.

14. The method of claim 13, wherein the correction data comprises at least one ionospheric-free cycle slip indicator per satellite, and wherein determining whether an ionospheric-free cycle slip has occurred comprises monitoring the ionospheric-free cycle slip indicators to determine an identity of at least one satellite for which an ionospheric-free cycle slip has occurred.

15. The method of claim 13, wherein estimating updated values for the set of state variables comprises applying a factorized array of recursive filters, the factorized array of recursive filters comprising a code-carrier filter bank using a Melbourne-Wuebbena code-carrier combination, an ionospheric filter bank using an ionospheric carrier combination, and a geometry filter using an ionospheric-free carrier combination.

16. The method of claim 15, wherein the correction data comprises at least one ionospheric-free cycle slip indicator per satellite, wherein determining that an ionospheric-free cycle slip has occurred comprises monitoring the ionospheric-free cycle slip indicators to identify an ionospheric-free cycle slip as to a specific satellite, and wherein resetting values of the state variables affected by the ionospheric-free cycle slip comprises resetting a value of an ionospheric-free ambiguity state for the specific satellite in the geometry filter.

17. The method claim 13, wherein estimating updated values for the set of state variables comprises applying a filter.

18. The method claim 17, wherein the correction data comprises at least one ionospheric-free cycle slip indicator per satellite, wherein determining that an ionospheric-free cycle slip has occurred comprises monitoring the ionospheric-free cycle slip indicators to identify an ionospheric-free cycle slip as to a specific satellite, and wherein resetting values of the state variables affected by the ionospheric-free cycle slip comprises resetting a value of an ionospheric-free ambiguity state for the specific satellite in the filter.

* * * * *